(12) United States Patent
Jiang et al.

(10) Patent No.: US 11,281,482 B2
(45) Date of Patent: Mar. 22, 2022

(54) I/O EMULATION WITH ABORTION IN VIRTUALIZED ENVIRONMENTS INCLUDING TRANSFER OF PORTIONS OF NON-REAL TIME I/O EMULATION TO WORK THREADS PRIOR TO SWITCHING CONTEXTS

(71) Applicant: Intel Corporation, Santa Clara, CA (US)

(72) Inventors: Yunhong Jiang, San Jose, CA (US); Chao Peng, Beijing (CN); Yao Zu Dong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 16/349,961

(22) PCT Filed: Dec. 14, 2016

(86) PCT No.: PCT/CN2016/109918
§ 371 (c)(1),
(2) Date: May 14, 2019

(87) PCT Pub. No.: WO2018/107394
PCT Pub. Date: Jun. 21, 2018

(65) Prior Publication Data
US 2019/0332407 A1 Oct. 31, 2019

(51) Int. Cl.
*G06F 9/455* (2018.01)
*G06F 16/11* (2019.01)
*G06F 9/30* (2018.01)

(52) U.S. Cl.
CPC ...... *G06F 9/45545* (2013.01); *G06F 9/30123* (2013.01); *G06F 9/45558* (2013.01);
(Continued)

(58) Field of Classification Search
CPC .......... G06F 9/45545; G06F 16/128; G06F 9/30123; G06F 9/45558; G06F 2009/45575; G06F 2009/45579; G06F 9/455
See application file for complete search history.

(56) References Cited

U.S. PATENT DOCUMENTS 6,668,326 B1 * 12/2003 Sella ............... G06F 9/4812
380/279
9,189,267 B2 11/2015 Kardashov et al.
(Continued)

FOREIGN PATENT DOCUMENTS

CN 101894045 11/2010

OTHER PUBLICATIONS

International Search Report and Written Opinion from related PCT/CN2016/109918 dated Sep. 20, 2017.
(Continued)

*Primary Examiner* — Michael W Ayers
(74) *Attorney, Agent, or Firm* — Hanley, Flight & Zimmerman, LLC

(57) ABSTRACT

A host machine includes a guest machine, a device emulator, and a hypervisor communicably coupled to the guest machine and the device emulator. The guest machine executes a non-real time thread that causes a non-real time I/O emulation by the device emulator. Responsive to receipt of a real time thread by the guest machine, the hypervisor determines whether the non-real time I/O emulation is abortable or non-abortable. If abortable, the hypervisor aborts the non-real time thread and causes the guest machine to execute the real time thread. Upon completing the execution of the real time thread, the hypervisor causes the guest machine to revert to a non-real time context based on a previous system snapshot. Upon establishing the non-real
(Continued)

time context, the hypervisor causes the guest machine to execute the previously aborted non-real time thread.

24 Claims, 6 Drawing Sheets

(52) U.S. Cl.
CPC ............ *G06F 16/128* (2019.01); *G06F 9/455* (2013.01); *G06F 2009/45575* (2013.01); *G06F 2009/45579* (2013.01)

(56) References Cited

U.S. PATENT DOCUMENTS

| | | | |
|---|---|---|---|
| 9,239,765 B2 | 1/2016 | Block et al. | |
| 10,210,650 B1* | 2/2019 | Acharya | G06F 9/505 |
| 2003/0037089 A1* | 2/2003 | Cota-Robles | G06F 9/45558 |
| | | | 718/1 |
| 2012/0117567 A1* | 5/2012 | Amano | G06F 9/5077 |
| | | | 718/1 |
| 2013/0070515 A1* | 3/2013 | Mayhew | G11C 11/4125 |
| | | | 365/148 |
| 2017/0308403 A1* | 10/2017 | Turull | G06F 9/4555 |
| 2019/0043159 A1* | 2/2019 | Levit-Gurevich | G06T 1/60 |

OTHER PUBLICATIONS

International Preliminary Report on Patentability from related PCT/CN2016/109918 dated Jun. 18, 2019.

\* cited by examiner

I/O EMULATION WITH ABORTION IN VIRTUALIZED ENVIRONMENTS INCLUDING TRANSFER OF PORTIONS OF NON-REAL TIME I/O EMULATION TO WORK THREADS PRIOR TO SWITCHING CONTEXTS

TECHNICAL FIELD

The present disclosure relates to execution of real time applications in virtualized environments.

BACKGROUND

Hardware or platform virtualization refers to the creation of a virtual machine that functions as a computing device that may have its own operating system. Software executed by such virtual machines is separated from the underlying system proving the virtual machine. In hardware virtualization environments, the machine on which the virtualization occurs (i.e., the machine providing the physical hardware) is referred to as the "host machine" while the virtual machine is referred to as the "guest machine." The terms "host" and "guest" may also be used to distinguish the software executed by the physical system (i.e., the software executed by the "host") from the software executed by the virtual machine (i.e., the software executed by the "guest"). The host system executes hypervisor or virtual machine manager (VMM) software that is used to initiate, interact with, and terminate virtual machines.

One benefit of virtualized systems is the decoupling of a virtual machine's input/output (I/O) devices from physical I/O devices, thereby allowing the implementation of a number of logical devices across a smaller number of physical devices. Such benefits however present significant challenges such as resource-management issues such as scheduling and prioritization of virtualized I/O across a number of guest machines on a host system. Virtualized I/O operations must traverse two separate I/O stacks, one in the virtual hardware manager implemented by the guest machine and a second in the hypervisor managing the physical system hardware coupled to the host machine. The increased I/O path distance affects latency and throughput and imposes additional load on the host system central processing unit (CPU).

When an application running on a guest system issues an I/O request, the request is processed by the I/O stack in the guest operating system. A device driver in the guest machine issues the I/O request to a virtual I/O device. The hypervisor intercepts the I/O request and schedules I/O requests from multiple guest machines to the underlying physical I/O device. When the physical I/O device completes the I/O request, the two I/O stacks must be traversed once again, this time in reverse order. The physical device may generate a completion interrupt which is handled by the hypervisor. The hypervisor determines which of the guest machines initiated the I/O request and notifies the respective guest machine by posting a virtual interrupt to the guest machine. Virtualized environments provide flexibility and manageability. Because of these advantages, there is an increasing demand to execute real time applications in virtualized environments such as within virtual machines. For example, within the telecom industry there is an increasing demand for Network Function Virtualization (NFV).

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1A:
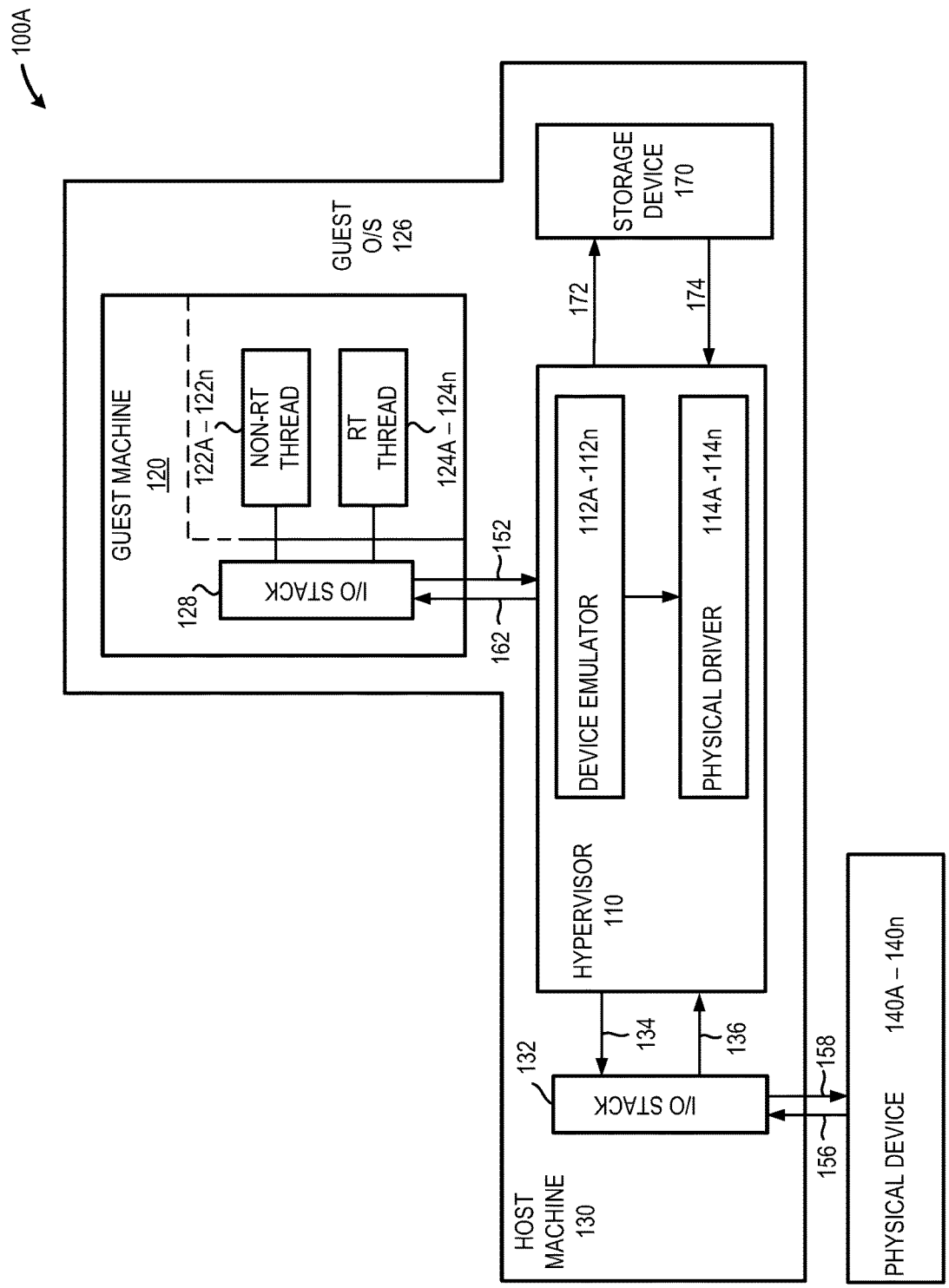
FIG. 1A is a block diagram of an illustrative system in which a hypervisor and a guest machine form logical physical structures within a physical host machine, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

A real time system implemented by a virtualized system may include multiple threads. In such instances, at least some of the threads may be non-real time threads and other threads may be real time threads. Typically, the real time threads pre-empt the non-real time threads if an event occurs that wakes or otherwise causes the real time thread to run. In a host system, this arrangement is acceptable because the preemption may be completed in a short time, for example within 1,000 CPU cycles. However, when running a real time application in a guest machine, preemption of a guest thread may take an unacceptably long time, adding to the latency of the response of the real time threads in the guest machine. One reason for this latency is the device emulation implemented by the guest machine. Within the virtualized environment, the hypervisor may, at times, implement the device model to emulate I/O devices. These emulated I/O devices are used by both non-real time threads and real time threads running on the guest machine. The emulated I/O devices include PCI bus, storage, network, interrupt controller, and similar. The device model may include one or more modules that exist within the hypervisor or elsewhere in a user space module.

When the non-real time thread running on a guest machine requires access to an I/O device, the I/O port access or MIMIO access must first transit the hypervisor, either through a hyper-call or trap. If the I/O device exists within a user space module, the context further transits to the user space. After the device emulation is complete, the context is switched back and the guest machine continues the execution. The time spent in device emulation can take considerable time, sometimes in excess of 100 milliseconds. During this time, the real time thread in the guest machine is blocked by the emulated I/O device caused by the non-real time thread.

A method of executing a real time task on a guest machine is provided. The method may include determining whether the guest machine is executing a non-real time thread that causes a device emulator communicably coupled to the hypervisor to perform a non-real time I/O emulation, the determination by the hypervisor responsive to a receipt of a request to execute a real time thread by a guest machine; causing, by the hypervisor, the guest machine to abort the non-real time I/O emulation responsive to determining the guest machine is causing the device emulator to perform the non-real time I/O emulation; switching, by the hypervisor, the guest machine from a non-real time context to a real time context; causing, by the hypervisor, the guest machine to execute the real time thread; causing, by the hypervisor, the guest machine to revert from the real time context to the non-real time context responsive to completing the execution of the real time thread; and causing, by the hypervisor, the guest machine to re-execute the non-real time thread responsive to reverting the guest machine from the real time context to the non-real time context.

A system for executing a real time thread on a guest machine in a virtualized environment is provided. The system may include guest machine circuitry; device emulator circuitry; and hypervisor circuitry communicably coupled to the guest machine circuitry and to the device emulator circuitry. The hypervisor circuitry may: determine whether the guest machine circuitry is causing the device emulator circuitry to perform a non-real time I/O emulation responsive to a receipt of an instruction by the guest machine circuitry to execute a real time thread; cause the device emulator circuitry to abort the non-real time I/O emulation responsive to a determination that the guest machine circuitry is causing the device emulator circuitry to perform the non-real time I/O emulation; cause the guest machine circuitry to switch from a non-real time context to a real time context responsive the device emulator circuitry aborting the non-real time I/O emulation; cause the guest machine circuitry to execute the real time thread responsive to causing the guest machine circuitry to switch from the non-real time context to the real time context; cause the guest machine circuitry to revert from the real time context to the non-real time context responsive to completing the execution of the real time thread; and cause the guest machine circuitry to execute the non-real time thread responsive to the guest machine circuitry reverting from the real time context to the non-real time context.

A nontransitory computer readable medium is provided. The nontransitory computer readable medium may include instructions that, when executed by a circuit, transform the circuit to dedicated and particular hypervisor. The hypervisor may: determine whether a communicably coupled guest machine is causing a communicably coupled device emulator to perform a non-real time I/O emulation responsive to a receipt of an instruction by the guest machine to execute a real time thread; cause the device emulator to abort the non-real time I/O emulation responsive to a determination that the guest machine is causing the device emulator to perform the non-real time I/O emulation; cause the guest machine to switch from a non-real time context to a real time context responsive the device emulator aborting the non-real time I/O emulation; cause the guest machine to execute the real time thread responsive to causing the guest machine to switch from the non-real time context to the real time context; cause the guest machine to revert from the real time context to the non-real time context responsive to completing the execution of the real time thread; and cause the guest machine to execute the non-real time thread responsive to the guest machine reverting from the real time context to the non-real time context.

A device including hypervisor circuitry is provided. The hypervisor circuitry may: determine whether guest machine circuitry causes device emulator circuitry to perform a non-real time I/O emulation, the determination made responsive to a receipt of an indication to execute a real time thread by the guest machine circuitry; cause the device emulator circuitry to abort the non-real time I/O emulation responsive to a determination that the guest machine circuitry causes the device emulator circuitry to perform the non-real time I/O emulation; cause the guest machine circuitry to switch from a non-real time context to a real time context responsive the device emulator circuitry aborting the non-real time I/O emulation; cause the guest machine circuitry to execute the real time thread responsive to causing the guest machine circuitry to switch from the non-real time context to the real time context; cause the guest machine circuitry to revert from the real time context to a non-real time context responsive to completing the execution of the real time thread; and cause the guest machine circuitry to execute the non-real time thread responsive to the guest machine circuitry reverting to the non-real time context.

A system for executing a real time task on a guest machine is provided. The system may include: a means for determining whether the guest machine is executing a non-real time thread that causes a device emulator to perform a non-real time I/O emulation responsive to a receipt of a request to execute a real time thread by the guest machine; a means for causing the guest machine to abort the non-real time I/O emulation responsive to determining the guest machine is causing the device emulator to perform the non-real time I/O emulation; a means for switching the guest machine from a non-real time context to a real time context; a means for causing the guest machine to execute the real time thread; a means for causing the guest machine to revert from the real time context to the non-real time context responsive to completing the execution of the real time thread; and a means for causing the guest machine to execute the non-real time thread.

As used herein the terms "top," "bottom," "lowermost," and "uppermost" when used in relationship to one or more elements are intended to convey a relative rather than absolute physical configuration. Thus, an element described as an "uppermost element" or a "top element" in a device may instead form the "lowermost element" or "bottom element" in the device when the device is inverted. Similarly, an element described as the "lowermost element" or "bottom element" in the device may instead form the "uppermost element" or "top element" in the device when the device is inverted.

FIG. 1A provides a block diagram of an illustrative system 100A in which a hypervisor 110 and a guest machine 120 form logical physical structures within a physical host machine 130, in accordance with at least one embodiment described herein. As depicted in FIG. 1A, the hypervisor 110 provides input/output device emulation via a number of device emulators 112A-112n (collectively "device emulators 112") and a number of physical device drivers 114A-114n (collectively, "physical device drivers 114"). In operation, guest machine input/output ("I/O") operations are performed by one or more non-real time threads 122A-122n (collectively, "non-real time threads 122") and/or one or more real time threads 124A-124n (collectively, "real time threads 124") executed by the guest operating system 126 running on the guest machine 120.

In some implementations, guest machine I/O tasks may be initiated by a non-real time thread 122 running under the guest operating system 126. In order to interface, interact, communicate, or otherwise exchange data and/or information with a physical device 140, such non-real time I/O operations must transit a guest machine I/O stack 128 prior to communication 152 to the hypervisor 110. Within the hypervisor 110, the non-real time I/O task passes through the appropriate device emulator 112 and physical device driver 114 prior to transmission 134 to a host machine I/O stack 132. The non-real time I/O task must transit the host machine I/O stack 132 prior to transmission 156 to the appropriate physical device 140 communicably coupled to the host machine 130.

Conversely, in order to return an acknowledgement or similar communication from the physical device 140 to the non-real time thread 122, the acknowledgement is first transmitted 158 to the host machine I/O stack 132. After transiting the host machine I/O stack 132 the hypervisor 110 receives 136 the acknowledgement. The hypervisor 110 communicates 162 the acknowledgement to the appropriate guest machine 120. In the guest machine 120, the acknowledgement transits the guest machine I/O stack 128 before forwarding to the non-real time thread 122.

Thus, a significant number of host machine central processing unit clock cycles (e.g., twenty to thirty million clock cycles or about a hundred milliseconds) are required to communicate the I/O task to the appropriate physical device 140 and to return an acknowledgement to the non-real time thread 122. The latency or temporal delay introduced by the relatively large number of clock cycles required to perform the non-real time I/O task may delay the execution of a time sensitive real time thread 124 by the guest machine 120. The systems and methods described herein beneficially reduce or even eliminate the latency introduced by such non-real time I/O tasks thereby permitting the execution of real time thread 124 by the guest machine 120.

Figure 2B:
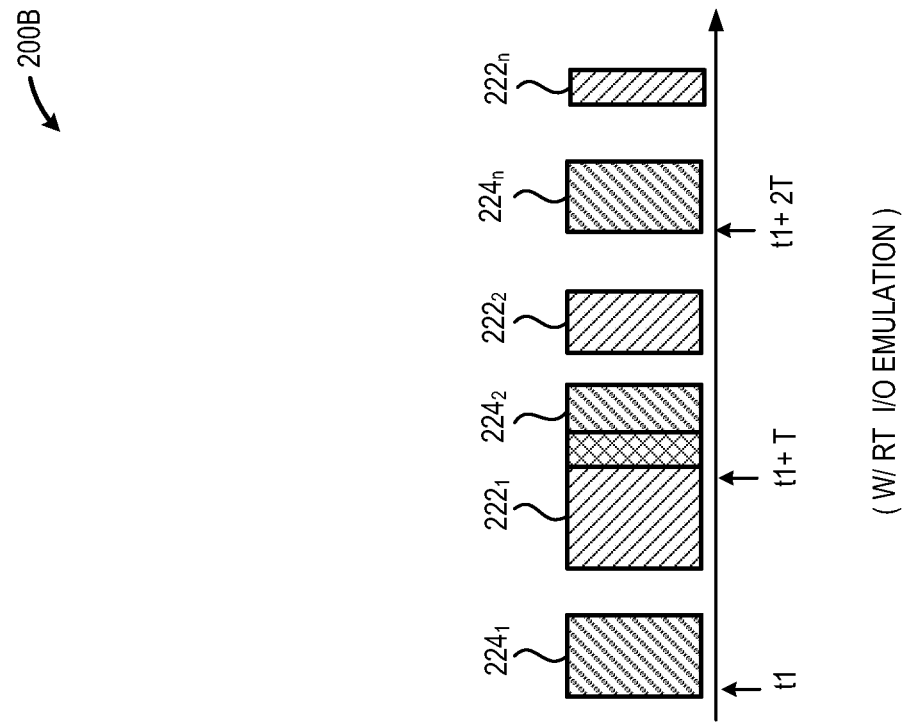
FIG. 2B provides a graphical depiction of an illustrative guest machine central processing unit (CPU) time or clock cycles to executing a non-real time thread performing an I/O operation and guest machine CPU time or clock cycles to executing a real time thread, in accordance with at least one embodiment described herein.
Figure 2A:
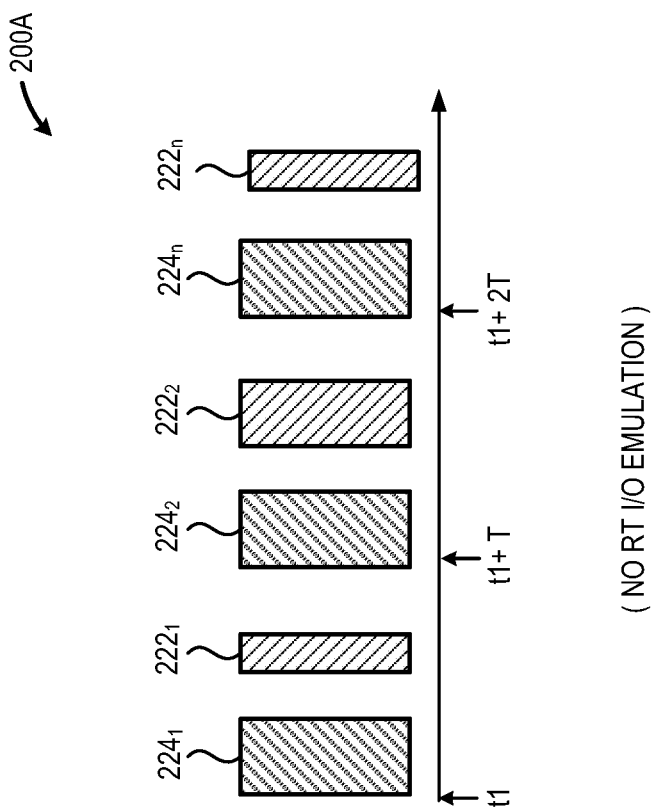
FIG. 2A provides a graphical depiction of the allocation of an illustrative guest machine central processing unit (CPU) time or clock cycles to executing a non-real time thread and guest machine CPU time or clock cycles to executing a real time thread, in accordance with at least one embodiment described herein.

Referring now to FIGS. 2A and 2B, FIG. 2A provides a graphical depiction of the allocation of an illustrative guest machine central processing unit (CPU) time or clock cycles $222_1$-$222_n$ to executing a non-real time thread 122 and guest machine CPU time or clock cycles $224_1$-$224_n$ to executing a real time thread 124, in accordance with at least one embodiment described herein. FIG. 2B provides a graphical depiction of an illustrative guest machine central processing unit (CPU) time or clock cycles $222_1$-$222_n$ to executing a non-real time thread 122 performing an I/O operation and guest machine CPU time or clock cycles $224_1$-$224_n$ to executing a real time thread 124, in accordance with at least one embodiment described herein. As depicted in FIG. 2A, a real time thread 122 may be executed at every "T" time and requires fewer clock cycles than are present in the interval "T". The guest machine CPU executes the non-real time thread 124 in the remaining clock cycles in the interval "T." As depicted in FIG. 2A, the execution of the non-real time thread 124 by the guest machine CPU (i.e., time blocks 224) is complimentary to and does not interfere or collide with the execution of the real time thread 122 by the guest machine CPU (i.e., time blocks 222).

Turning to FIG. 2B, the example non-real time thread 124 is now depicted as performing a non-real time I/O emulation in response to a non-real time I/O task. Significantly, the non-real time I/O emulation requires a significant number of clock cycles to complete, due at least in part to the circuitous path followed by the non-real time I/O task. As depicted in FIG. 2B, the real time thread 124 may again be executed at intervals of "T" and again requires fewer clock cycles than included in the interval "T". The guest machine 120 attempts to perform the non-real time I/O emulation at $222_1$, however the extended time required in non-real time I/O emulation $222_1$ delays the execution $224_2$ of real time thread 122, causing the real time thread 122 to miss the execution deadline.

Returning to FIG. 1A, the systems and methods described herein beneficially provide a hypervisor 110 having the capability to reduce or even eliminate interference between execution of an I/O operation requested by a non-real time thread and execution of a real time thread. In embodiments, the hypervisor 110 may provide priority to the execution of a real-time thread 124 when a non-real time thread 122 is in the process of performing or otherwise executing an I/O task.

In embodiments, a non-real time I/O emulation may be considered either abortable or non-abortable. A non-limiting example of an abortable non-real time I/O emulation includes the emulation of a disk read or a disk write operation via a disk controller. A non-limiting example of a non-abortable non-real time I/O emulation includes the emulation of a transmission of a data packet across a packet switched network via a network interface.

Upon receiving a non-real time I/O task 152, the hypervisor 110 may acquire a system snapshot of all or a portion of the guest machine 120. The system snapshot may capture the logical state of all or a portion of the components forming the guest machine 120 at the time of receipt of the non-real time I/O task 152. For example, the system snapshot may include data or information representative of the logical states of one or more of the following components included in or forming the guest machine 120: random access memory (RAM) content, basic input/output (BIOS) settings, the host machine central processing unit (CPU) registers, and similar. The hypervisor 110 may transmit 172 and store, and/or otherwise retain data or information representative of the acquired system snapshot in a physical data storage device 170, such as a physical random access memory (RAM) in the host machine 130.

In the case of an abortable non-real time I/O emulation, upon receiving a task or operation associated with a real time thread 124, the hypervisor 110 may abort the non-real time I/O emulation in order to execute the real time thread 124. Upon completing the execution of the real time thread 124, the hypervisor 110 may retrieve 174 the stored system snapshot from the physical data storage device 170. Using at least a portion of the logical state data or information included in the retrieved system snapshot, the hypervisor returns some or all of the guest machine 120 to a previous logical state, such as the guest machine logical state at the time the non-real time I/O emulation was received. Once the guest machine 120 is restored to the previous logical state, the hypervisor 110 may cause the guest machine 120 re-execute the non-real time I/O task. Thus, for abortable non-real time I/O emulations, hypervisor 110 minimizes the likelihood of conflicts occurring between real time threads 124 and non-real time threads 122 that include I/O tasks, thereby beneficially and advantageously facilitating the execution of real time threads 124 on guest machine 120.

In the case of a non-abortable non-real time I/O emulation, upon receiving a task or operation associated with a real time thread 124, the hypervisor 110 may pass or otherwise transfer the "in-process" non-real time I/O emulation to an asynchronous work thread. In embodiments, the asynchronous work thread may then complete the "in-process" non-real time I/O emulation. After passing or transferring the non-real time I/O emulation to the asynchronous work thread, the hypervisor 110 then executes the real time thread 124. In some implementations, the execution of at least a portion of the real time thread 124 and at least a portion of the emulation I/O device associated with the non-real time task may occur either simultaneously or contemporaneously. Thus, for non-abortable non-real time I/O emulations, providing the hypervisor 110 with the capability to transfer the non-real time I/O emulation to the asynchronous work thread requires only the time required by the hypervisor 100 to effect the transfer to the work thread. Such a transfer reduces the likelihood of conflict between a real time thread 124 and a non-real time thread 124 that includes a non-abortable I/O emulation, thereby beneficially and advantageously facilitating the execution of real time threads 124 on guest machine 120.

The hypervisor 110 may include software, firmware, hardware, or any combination thereof. In some implementations, the hypervisor 110 may be implemented in whole or in part as a physical programmable logic device containing discrete, configurable and/or reconfigurable, electrical components and/or semiconductor devices. Illustrative physical programmable logic devices include, but are not limited to: single or multi-core processors/microprocessors, controllers, digital signal processors (DSPs), programmable gate arrays (PGAs), application specific integrated circuits (ASICs), systems on a chip (SoCs), and the like. In some implementations, the hypervisor 110 may be implemented as defined, particular, and specialized, machine that includes circuitry formed using any number of electrical components and/or any number of semiconductor devices conductively coupled in a defined arrangement to form or otherwise provide the hypervisor 110. In some implementations, the hypervisor 110 may include, in whole or in part, any number of hardwired circuits and/or circuitry. In some implementations, the hypervisor 110 may include a combination of software, firmware, and hardware implemented as one or more modules, one or more logic elements, or any combination thereof.

As depicted in system 100A, in some embodiments, the hypervisor 110 may include one or more device emulators 112A-112n (collectively, "device emulators 112") and one or more communicably coupled physical device drivers 114A-114n (collectively, "physical device drivers 114"). Each of the device emulators 112 provides an emulated interface for at least one physical I/O device 142 to the guest machine 120. Each of the physical device drivers 114 provides an interface between the device emulator 112 and at least one physical I/O device 142. In embodiments, the host machine 130 provides an electrically conductive communications pathway between the physical device driver 114 and the physical I/O device 142. For example, as depicted in FIG. 1A, the output 134 from the physical device driver 114 in the hypervisor 110 is provided to the host machine I/O stack 132. The host machine I/O stack 132 transmits 156 and/or receives 158 data and/or information from the physical devices 140A-140n.

Although system 100A is depicted in FIG. 1A as including only a single hypervisor 110, system 100A may include any number of similar hypervisors 110 disposed, in whole or in part, within a single host machine 130. In some implementations, all or a portion of the hypervisor 110 may be disposed in a peer host machine 130 and/or in a network connected device, such as a remote server. Although depicted in FIG. 1A as communicably coupled to a single guest machine 120, the hypervisor 110 may be communicably coupled to any number of guest machines 120A-120n.

The hypervisor 110 may, at times, be synonymously referred to as a virtual machine manager (VMM). In embodiments, the hypervisor 110 may electrically/conductively couple and/or logically connect a number of electrical components and/or semiconductor devices to form all or a portion of the guest machine 120. In embodiments, the hypervisor 110 may control one or more functions and/or operational characteristics (CPU clock speed, bus clock speed, etc.) of the guest machine 120. The hypervisor 110 provides the guest machine 120 with a virtual operating platform logically independent from the underlying host machine 130 in which the hypervisor 130 and/or the guest machine 120 exist. Thus, the guest machine 120 may execute a guest operating system that is the same as or different from the host operating system of the host machine 130. The hypervisor 110 beneficially permits any number of guest machines 120 to share physical hardware and resources provided by and/or communicably coupled to the host machine 130.

Each of the device emulators 112 may include software, firmware, hardware, or any combination thereof. In some implementations, some or all of the device emulators 112 may be implemented, in whole or in part, as circuitry capable of executing machine readable instruction sets. In some implementations, some or all of the device emulators 112 may be implemented in whole or in part by the hypervisor 110 as a physical programmable logic device containing discrete, configurable and/or reconfigurable, electrical components and/or semiconductor devices. Illustrative physical programmable logic devices include, but are not limited to: single or multi-core processors/microprocessors, controllers, digital signal processors (DSPs), programmable gate arrays (PGAs), application specific integrated circuits (ASICs), systems on a chip (SoCs), and the like. In some implementations, some or all of the device emulators 112 may be implemented within the hypervisor 110. For example, the device emulator 112 may be implemented as a particular and specialized circuit within a particular and specialized circuit providing the hypervisor 110. In some implementations, some or all of the device emulators 112 may be implemented within a user space within the host machine 130. For example, the device emulator 112 may be implemented as a particular and specialized circuit within a user space within the host machine 130.

Each of the physical device drivers 114 may include software, firmware, hardware, or any combination thereof capable of interfacing the I/O device emulator 112 with a particular physical device 140 communicably coupled to the host device 130. In some implementations, some or all of the physical device drivers 114 may be implemented, in whole or in part, as circuitry capable of executing machine readable instruction sets. In some implementations, some or all of the physical device drivers 114 may be implemented in whole or in part by the hypervisor 110 as a physical programmable logic device containing discrete, configurable and/or reconfigurable, electrical components and/or semiconductor devices. Illustrative physical programmable logic devices include, but are not limited to: single or multi-core processors/microprocessors, controllers, digital signal processors (DSPs), programmable gate arrays (PGAs), application specific integrated circuits (ASICs), systems on a chip (SoCs), and the like. In some implementations, some or all of the physical device drivers 114 may be implemented within the hypervisor 110. For example, a physical device driver 114 may be implemented as a particular and specialized circuit within a particular and specialized circuit providing the hypervisor 110.

In embodiments, the guest machine 120 may include any number and/or combination of components to support the execution of a guest operating system 126. In embodiments, the guest machine 120 may include an emulated processor capable of executing a single real time thread or non-real time thread. In embodiments, the guest machine 120 may include an emulated multi-core processor capable of simultaneously executing a plurality of real time threads, non-real time threads, or combinations thereof. The guest machine 120 may include an input/output stack 128 that I/O tasks, including non-real time I/O tasks must transit prior to transmission 152 to the hypervisor 110.

The guest machine 120 may include software, firmware, hardware, or any combination thereof. In some implementations, the guest machine 120 may be implemented in whole or in part as a physical programmable logic device containing discrete, configurable and/or reconfigurable, electrical components and/or semiconductor devices. Illustrative physical programmable logic devices include, but are not limited to: single or multi-core processors/microprocessors, controllers, digital signal processors (DSPs), programmable gate arrays (PGAs), application specific integrated circuits (ASICs), systems on a chip (SoCs), and the like. In some implementations, the guest machine 120 may be implemented as defined, particular, and specialized, machine that includes circuitry formed using any number of electrical components and/or any number of semiconductor devices conductively coupled in a defined arrangement to form or otherwise provide the guest machine 120. In some implementations, the guest machine 120 may include, in whole or in part, any number of hardwired circuits and/or circuitry. In some implementations, the guest machine 120 may include a combination of software, firmware, and hardware implemented as one or more modules, one or more logic elements, or any combination thereof.

Although only a single guest machine 120 is depicted in FIG. 1A, any number of similar guest machines 120A-120n may be communicably coupled to a single hypervisor 110 disposed, in whole or in part, within a single host machine 130. In some implementations, all or a portion of the guest machine 120 may be disposed in a peer host machine 130 and/or in a network connected device, such as a remote server.

The host machine 130 may include any processor-based device or combination of processor-based systems and devices having one or more processors, one or more memories, and one or more I/O interfaces. In embodiments, the host machine 130 includes a physical entity containing appropriate software, hardware, and firmware to host one or more hypervisors 110A-110n and one or more guest machines 120A-120n. The host machine 130 may include any number and/or combination of currently available or future developed portable computers, desktop computers, handheld computers, smartphones, workstation computers, servers, rack-mount servers, or combinations thereof.

The physical devices 140A-140n may include any number and/or combination of currently available and/or future developed physical I/O devices. Non-limiting example physical devices 140 may include, but are not limited to, storage devices, network interface cards, wireless interface cards, media access cards, hardcopy output devices, video display devices, haptic input/output devices, keyboards, mice, etc.

Figure 1B:
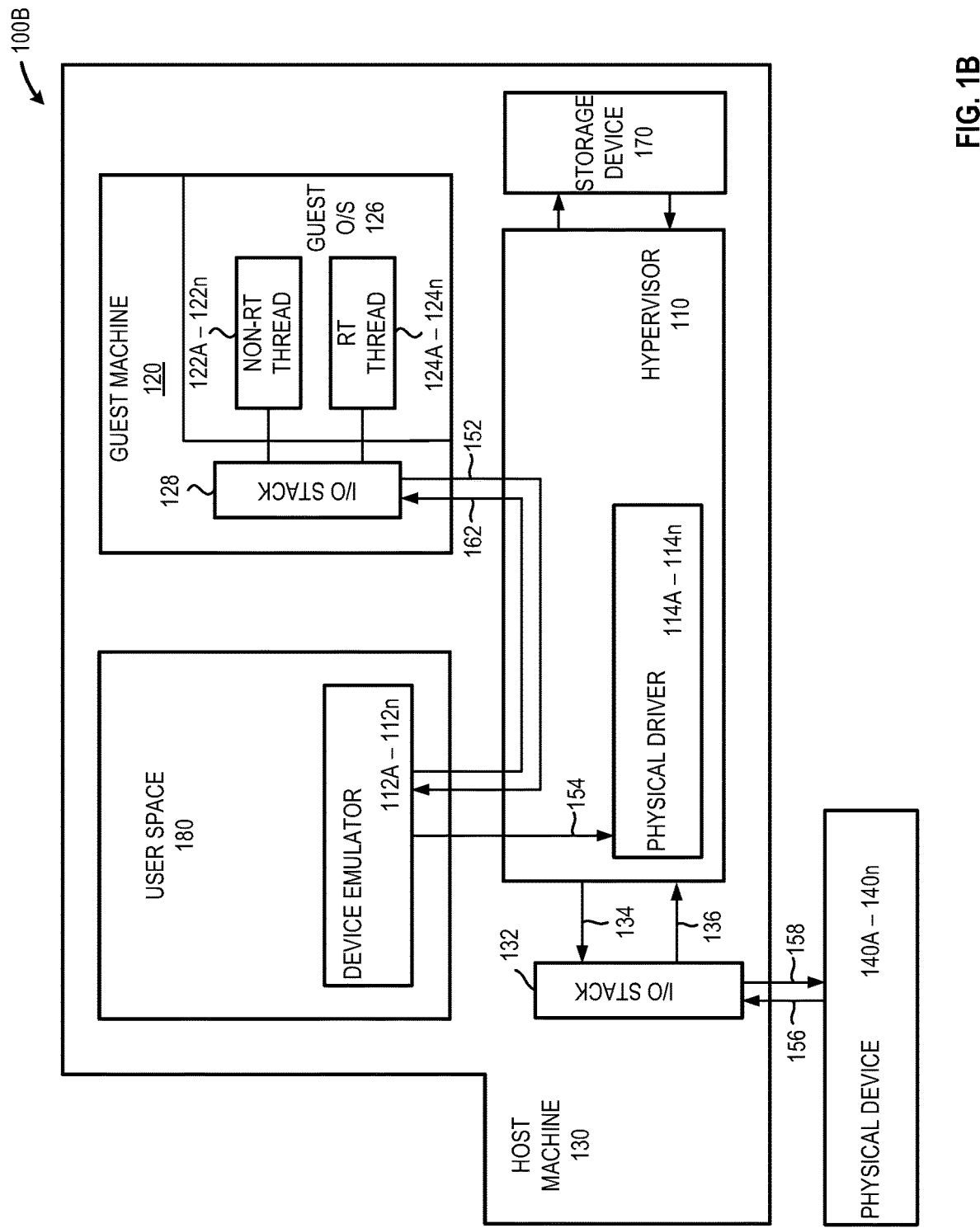
FIG. 1B provides a block diagram of another illustrative system in which a hypervisor and a communicably coupled guest machine form a logical, physical, structure within a physical host machine, in accordance with at least one embodiment described herein.

FIG. 1B provides a block diagram of another illustrative system 100B in which a hypervisor 110 and a communicably coupled guest machine 120 form a logical, physical, structure within a physical host machine 130, in accordance with at least one embodiment described herein. As depicted in system 100B, the hypervisor 110 communicates a non-real time I/O task to at least one of a number of device emulators 112A-112n in user space 180. The output 154 from the device emulator 112 is returned to one or more physical device drivers 114A-114n implemented by the hypervisor 110. In such an arrangement, since the device emulators 112 are implemented in user space 180, the device emulators 112 may be accessed and used by multiple hypervisors 110.

As depicted in system 100B, guest machine I/O tasks may be initiated by a non-real time thread 122 running under the guest operating system 126. In order to interface, interact, communicate, or otherwise exchange data and/or information with a physical device 140, the non-real time I/O task must transit the guest machine I/O stack 128 prior to transmission, via the hypervisor 110, to the device emulator 112 in user space 180. Within the user space 180, the non-real time I/O task passes through the appropriate device emulator 112. The device emulator 112 then transmits 154 the non-real time I/O task to a physical device driver 114 in hypervisor 110. Hypervisor 110 then transmits 134 the non-real time I/O task to a host machine I/O stack 132. The non-real time I/O task must transit the host machine I/O stack 132 prior to transmission 156 to the appropriate physical device 140 communicably coupled to the host machine 130.

Conversely, in order to return a communication, such as an acknowledgement, from the physical device 140 to the non-real time thread 122, the communication is first transmitted 158 to the host machine I/O stack 132. After transiting the host machine I/O stack 132 the hypervisor 110 receives 136 the communication. The hypervisor 110 transmits 162 the communication to the appropriate guest machine 120. In the guest machine 120, the communication transits the guest machine I/O stack 128 before forwarding to the non-real time thread 122.

Figure 3:
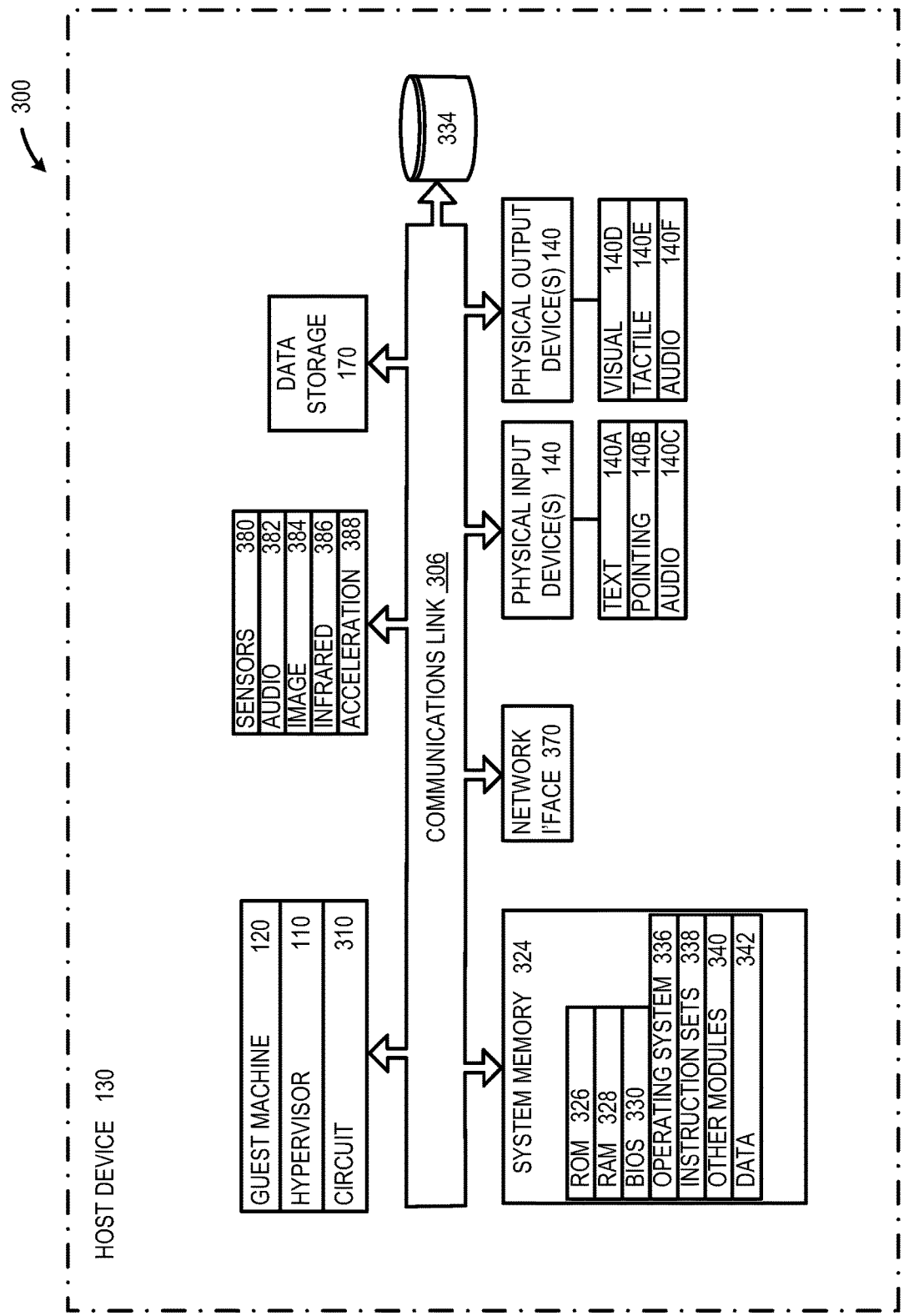
FIG. 3 is a block diagram of an illustrative system that includes one or more circuits that provide one or more hypervisors and one or more guest machines capable of pre-empting or otherwise aborting one or more non-real time threads, such as one or more non-real time threads involving I/O emulation, upon receipt of one or more real time threads, in accordance with at least one embodiment described herein.

FIG. 3 and the following discussion provide a brief, general description of the components forming an illustrative system 300 that includes one or more circuits 310 that provide one or more hypervisors 110 and one or more guest machines 120 capable of pre-empting or otherwise aborting one or more non-real time threads 122, such as one or more non-real time threads involving I/O emulation, upon receipt of one or more real time threads 124, in accordance with at least one embodiment described herein.

At least some embodiments or implementations may include machine-readable or computer-executable instruction sets, such as program application modules, objects, or macros being executed by the hypervisor 110, guest machine 120, and/or host machine 130. At least some embodiments or implementations may include circuitry implemented in the form of hard-wired circuitry and components, semiconductor circuitry, microprocessors, controllers, or similar devices that provide the various components, systems, subsystems, logic devices, logic elements, or modules forming the hypervisor 110 and/or guest machine 120.

Those skilled in the relevant art will appreciate that the illustrated embodiments as well as other embodiments can be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The host machine 130 may include any number of circuits 310, each of which may include a variety of electronic and/or semiconductor components that are disposed partially or wholly in a wearable computer, portable computing device, personal digital assistant, personal computer, or other similar current or future processor-based devices and/or systems capable of executing machine-readable instructions. The one or more circuits 310 may be interconnected with, electrically coupled, and/or communicably coupled to various components within the host machine 130 via one or more communications links 306. As depicted in FIG. 3, all or a portion of the one or more circuits 310 may be apportioned or allocated to providing, forming, or otherwise building all or a portion of the hypervisor 110 and the guest machine 120.

As depicted in FIG. 3, system components such as a system memory 324 may be communicably coupled to the one or more circuits 310 via the one or more communications links 306. The host machine 130 may, at times, be referred to in the singular herein, but this is not intended to limit the embodiments to a single system, since in certain embodiments, there will be more than host machine 130, networked host machines 130A-130n, client/server host machines 130, or other networked systems, circuits, or devices involved.

The one or more circuits 310 may include any number, type, or combination of conductors, insulators, electrical devices, and/or semiconductor components. At times, the one or more circuits 310 may be implemented in whole or in part in the form of semiconductor devices such as diodes, transistors, inductors, capacitors, and resistors. Such an implementation may include, but is not limited to any current or future developed single- or multi-core processor or microprocessor, such as: one or more systems on a chip (SOCs); one or more central processing units (CPUs); one or more digital signal processors (DSPs); one or more graphics processing units (GPUs); one or more application-specific integrated circuits (ASICs), one or more field programmable gate arrays (FPGAs), and the like. Unless described otherwise, the construction and operation of the various blocks shown in FIG. 3 are of conventional design. As a result, such blocks need not be described in further detail herein, as they will be understood by those skilled in the relevant art. The one or more communications links 306 that interconnects at least some of the components may employ any known serial or parallel bus structures or architectures.

The system memory 324 may include read-only memory ("ROM") 326 and random access memory ("RAM") 328. A portion of the ROM 326 may contain a basic input/output system ("BIOS") 330. The BIOS 330 may provide basic functionality to the host machine 130. For example, by causing, in some implementations, the one or more circuits 310 to load one or more machine-readable instruction sets that cause the one or more circuits 310 to provide and function as a particular and specialized hypervisor 110 and/or guest machine 120.

The host machine 130 may include one or more communicably coupled, non-transitory, data storage devices 170. The one or more data storage devices 170 may include any number and/or combination of any current or future developed non-transitory storage devices and/or memory. Non-limiting examples of such non-transitory, data storage devices 170 may include, but are not limited to one or more magnetic storage devices, one or more optical storage devices, one or more solid-state electromagnetic storage devices, one or more electroresistive storage devices, one or more molecular storage devices, one or more quantum storage devices, or various combinations thereof.

The one or more storage devices 170 may include interfaces or controllers (not shown) communicatively coupling the respective storage device(s) 170 to the one or more communications links 306, as is known by those skilled in the art. The one or more storage devices 170 may contain machine-readable instruction sets, data structures, program modules, and other data useful to the host machine 130.

In some instances, one or more external storage devices 334 may be communicably coupled to the host machine 130. Such external storage devices 334 may be local to the host machine 130 or remote from the host machine 130. In one example, the one or more external storage devices 334 may include one or more remote server based storage devices or "cloud" storage devices that are bi-directionally communicably coupled to the host machine 130 via one or more networks, such as one or more wireless networks (e.g., IEEE 802.11 "Wi-Fi"), one or more wired networks (e.g., IEEE 802.3 "Ethernet"), or combinations thereof.

The host machine 130 may include a number of sensors 380 that are communicably coupled to the hypervisor 110 and/or the guest machine 120 via the one or more communications links 306. In some implementations, the sensors 380 may include some or all of: one or more audio input sensors 382 (e.g., one or more microphones or similar); one or more image sensors 384 (e.g., one or more charge coupled device (CCD) or complementary metal oxide semiconductor (CMOS) image sensors, ambient light level sensors, or similar); one or more infrared illuminators/infrared image acquisition sensors 386; one or more acceleration, velocity, movement, or motion based sensors 388, or combinations thereof. In at least some implementations, such sensors 480 may autonomously collect environmental data or information on a regular, irregular, periodic, or aperiodic basis. In some implementations, the host machine 130 may include one or more geolocation or global positioning sensors, transponders or similar devices.

Machine-readable instruction sets and/or applications 338 and housekeeping instruction sets 340 may be stored or otherwise retained in whole or in part in the storage device 170 or in whole or in part, in system memory 324. Such instruction sets may be transferred from one or more storage devices 170 and/or one or more external storage devices 334 and stored in the system memory 324 in whole or in part for execution by the one or more circuits 310. The machine-readable instruction sets 338 may include instructions and/or logic providing the semantic labeling functions and capabilities described herein.

For example, one or more applications 338 may cause the circuitry 310 to provide one or more hypervisors 110 having the capability to assess whether a non-real time thread 122 causing a non-real time I/O emulation is abortable or non-abortable. One or more applications 338 may cause the circuitry 310 to provide one or more hypervisors 110 having the capability to abort an abortable non-real time I/O emulation upon receipt of a real time thread 124 for execution by the guest machine 120. One or more applications 338 may cause the circuitry 310 to provide one or more hypervisors 110 having the capability to restore the guest machine 120 to a previous logical state using a system snapshot saved in the storage device 170 upon completion of the execution of the real time thread 124 by the guest machine 130. One or more applications 338 may cause the circuitry 310 to provide one or more hypervisors 110 having the capability to cause the guest machine 120 to re-execute the non-real time thread 122 causing the non-real time I/O emulation. Such re-execution of the non-real time thread 122 may occur, for example, upon restoration of the guest machine 120 to a logical state at the time the non-real time thread 122 which caused the non-real time I/O task was initiated. One or more applications 338 may cause the circuitry 310 to provide one or more hypervisors 110 having the capability to transfer a non-abortable non-real time I/O emulation to an asynchronous work thread. In some implementations, the receipt of a real time thread 124 for execution by the guest machine 120 may cause the hypervisor 110 to transfer the non-abortable non-real time I/O emulation to the work threadupon. One or more applications 338 may cause the circuitry 310 to provide one or more hypervisors 110 having the capability to execute the real time thread 124 upon successful transfer of the non-abortable non-real time I/O emulation to the asynchronous work thread.

The host machine 130 may include one or more communicably coupled physical input devices 140, such as one or more text entry devices 352 (e.g., keyboard), one or more pointing devices 354 (e.g., mouse, trackball, touchscreen), and/or one or more audio input devices 356. Such physical input devices 140 may be used, for example, to provide, enter, or otherwise supply commands (e.g., acknowledgements, selections, confirmations, and similar) as well as information (e.g., acknowledgements, and similar) to the hypervisor 110, guest machine 120, and/or host machine 130. The host machine 130 may include one or more communicably coupled physical output devices 140, such as one or more visual output devices 362 (e.g., a display device), one or more tactile output devices 364 (e.g., haptic feedback or similar), one or more audio output devices 366, or any combination thereof.

For convenience, the network interface 370, the one or more circuits 310, the system memory 324, the physical input devices 140 and the physical output devices 140 are illustrated as communicatively coupled to each other via the one or more communications links 306, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In some embodiments, the one or more communications links 306 may be omitted and the components are coupled directly to each other using suitable wired or wireless connections.

Figure 4:
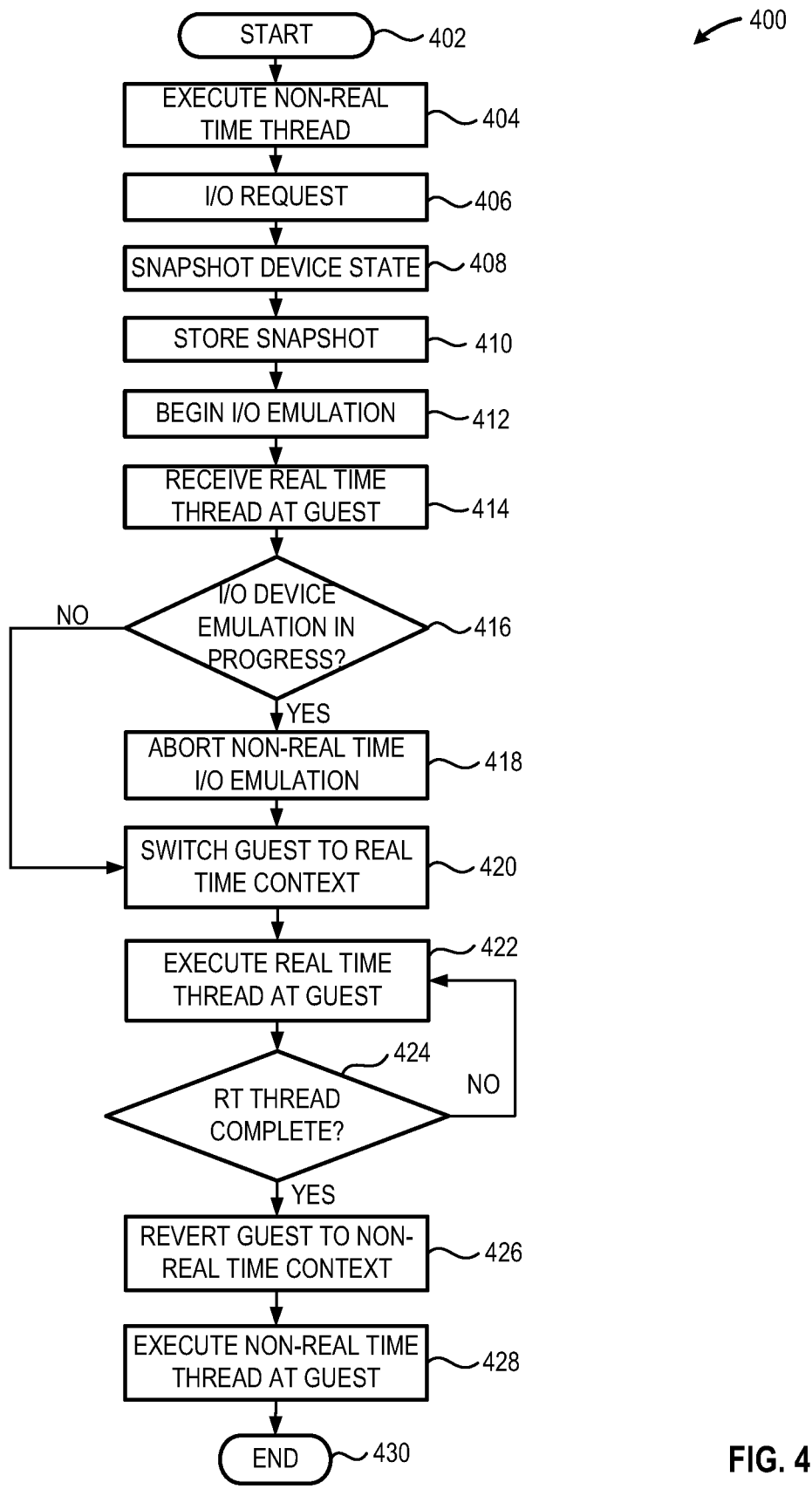
FIG. 4 provides a high-level logic flow diagram of an illustrative method of executing a real time thread by aborting a non-real time I/O emulation caused by a non-real time thread, in accordance with at least one embodiment described herein.

FIG. 4 provides a high-level logic flow diagram of an illustrative method 400 of executing a real time thread 124 by aborting a non-real time I/O emulation caused by a non-real time thread 122, in accordance with at least one embodiment described herein. In some implementations, a hypervisor 110 may interrupt, suspend, or abort the execution of a non-real time thread 122 causing a non-real time I/O emulation in response to receiving a real time thread 124. In such instances, prior to executing the non-real time I/O emulation associated with the non-real time thread 122, the hypervisor 110 may acquire and store a system snapshot that captures the logical state of at least a portion of the guest machine 120. Upon completing execution of the real time thread, the hypervisor 110 may then restore at least a portion of the guest machine 120 to the logical state prior to executing the non-real time thread 124. After restoring the logical state of the guest machine, the hypervisor 110 may execute the non-real time thread 124 causing the non-real time I/O emulation. The method 400 commences at 402.

At 404, the hypervisor 110 causes the guest machine 120 to begin execution of a non-real time thread 122. In some implementations, the execution of the non-real time thread 122 causes the guest machine 120 to generate a non-real time I/O task. The non-real time I/O task generated by the guest machine 120 is communicated 152 to a device emulator 112. The device emulator may be internal to the guest machine 120 or external to the guest machine 120. In some implementations, the device emulator 112 may be located in the hypervisor 110. In other implementations, the device emulator 112 may be located in user space 180 within the host machine 130.

At 406, the guest machine 120 generates an I/O request or a MIMIO access request. The I/O request or the MIMIO access request causes a trap or hyper call that is received at the hypervisor 110.

At 408, the hypervisor 110 acquires or otherwise obtains a snapshot that includes information representative of a logical state of at least a portion of the guest machine 120. In some implementations, the snapshot may include any information and/or data useful for quickly restoring and/or resetting the guest machine 120 to the logical state immediately prior to executing the non-real time thread 122.

At 410, the hypervisor 110 stores all or a portion of the information and/or data representative of the acquired snapshot in system memory 324, for example in RAM 328. In some implementations, the hypervisor 110 stores all or a portion of the information and/or data representative of the acquired snapshot in the storage device 170.

At 412, the hypervisor 110 and the device emulator 112 commence the I/O emulation for the non-real time thread 122.

At 414, the guest machine 120 receives a real time thread 124 for execution. The real time thread 124 may be received by the guest machine 120 at any time subsequent to the guest machine 120 initiating execution of the non-real time thread 122 and prior to the guest machine 120 completing execution of the non-real time thread 122.

At 416, the hypervisor 110 determines whether a non-real time I/O emulation is in progress. In at least some implementations, the hypervisor 110 may assess the status of the device emulator 112 to determine whether a non-real time I/O emulation is in progress. If the hypervisor 110 determines a non-real time I/O emulation is not in progress, the method 400 proceeds to 420. If the hypervisor 110 determines a non-real time I/O emulation is in progress in the device emulator 112, the method 400 proceeds to 418.

At 418, in response to receipt of the real time thread 124 for execution by the guest machine 120, the hypervisor 110 injects the real time thread 124 to the guest machine 120, causing the guest machine 120 to suspend, interrupt, or otherwise abort the non-real time thread 122 creating the non-real time I/O emulation. In some implementations, the hypervisor 110 may directly suspend, interrupt, or otherwise abort the non-real time I/O emulation.

At 420, the hypervisor 110 causes the guest machine 120 to switch to a real time context prior to executing the real time thread 124 received at 410.

At 422, the hypervisor 110 causes the guest machine 120 to execute the real time thread 124 received at 410.

At 424, if the guest machine 120 has completed the execution of real time thread 124, the method 400 proceeds to 426. If the guest machine 120 has not completed execution of the real time thread 124, the method 400 returns to 422.

At 426, the hypervisor 110, using the system snapshot acquired at 404 and stored at 406, restores the guest machine 120 to a non-real time context. In some implementations, the non-real time context may include the logical state of at least a portion of the guest machine 120 prior to or at the time of execution of the non-real time thread 122 at 404.

At 428, after restoring the hypervisor 110 causes the guest machine 120 to execute the previously aborted non-real time thread 122 that caused the non-real time I/O emulation. The method 400 concludes at 430.

Figure 5:
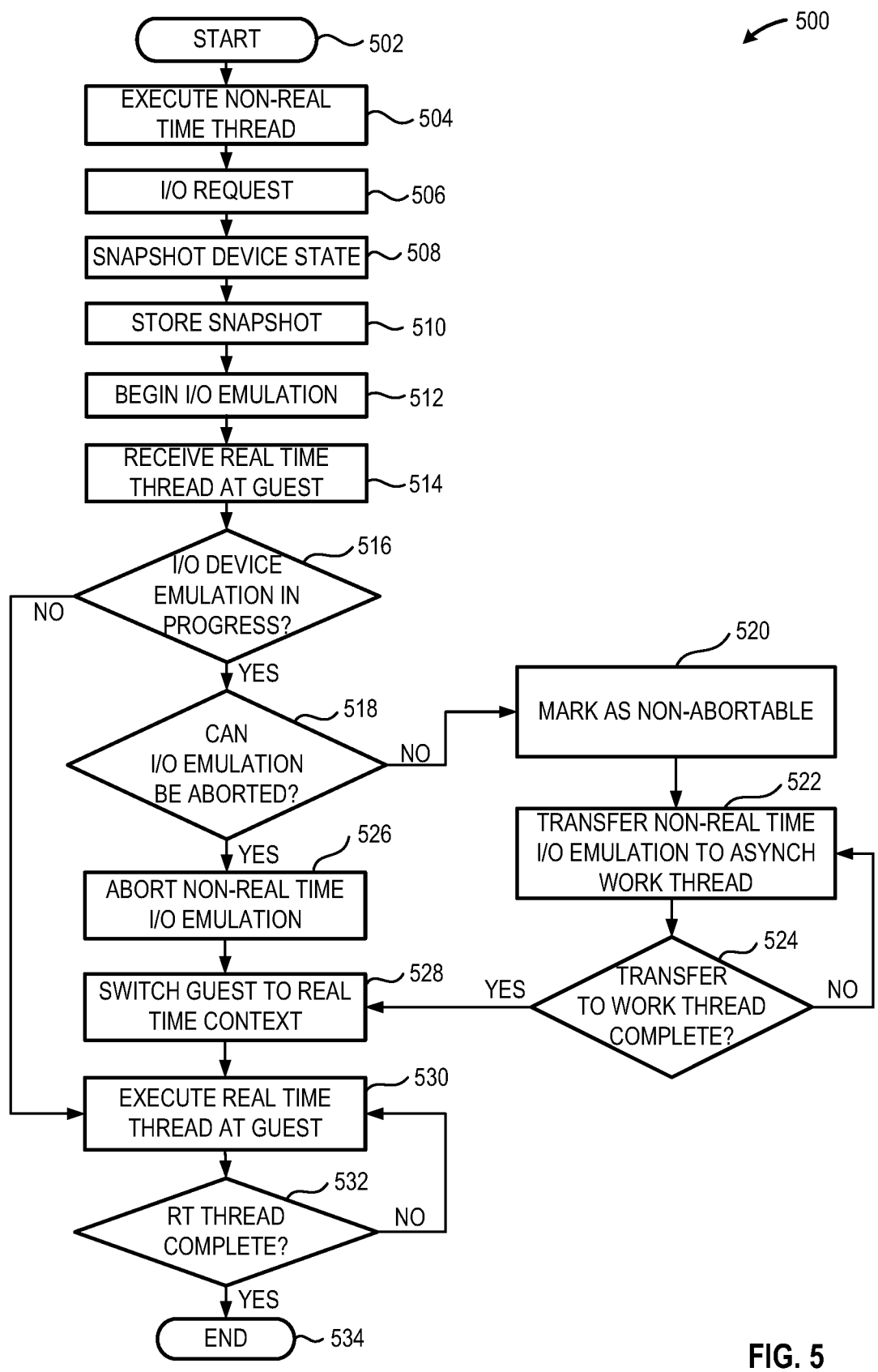
FIG. 5 provides a high-level logic flow diagram of another illustrative method of executing a real time thread by aborting a non-real time I/O emulation caused by a non-real time thread, in accordance with at least one embodiment described herein.

FIG. 5 provides a high-level logic flow diagram of another illustrative method 500 of executing a real time thread 124 by aborting a non-real time I/O emulation caused by a non-real time thread 122, in accordance with at least one embodiment described herein. At times, some non-real time I/O emulations may not be immediately abortable. For example, immediately aborting a non-real time I/O emulation such as a transmission or a reception of a packet via a packet switched network may result in errors or duplicated packets. Thus, prior to aborting a non-real time I/O emulation, the hypervisor 110 may determine whether the non-real time I/O emulation is abortable or non-abortable. If the hypervisor 110 determines the non-real time I/O emulation is non-abortable, the hypervisor 110 causes the non-real time I/O emulation to either transfer to an asynchronous work thread where the non-abortable, non-real time I/O emulation is able to complete, or begin the non-real time I/O emulation as a new work thread. Upon completion of the transfer to the asynchronous work thread, the hypervisor 110 is able to switch the guest machine 120 to a real time context to execute the real time thread 124. The method 500 commences at 502.

At 504, the hypervisor 110 causes the guest machine 120 to begin execution of a non-real time thread 122.

At 506, the guest machine 120 generates an I/O request or a MIMIO access request. The I/O request or the MIMIO access request causes a trap or hyper call that is received at the hypervisor 110.

At 508, the hypervisor 110 acquires or otherwise obtains a snapshot that includes information representative of a logical state of at least a portion of the guest machine 120. In some implementations, the snapshot may include any information and/or data useful for quickly restoring and/or resetting the guest machine 120 to the logical state immediately prior to executing the non-real time thread 122.

At 510, the hypervisor 110 stores all or a portion of the information and/or data representative of the acquired snapshot in system memory 324, for example in RAM 328. In some implementations, the hypervisor 110 stores all or a portion of the information and/or data representative of the acquired snapshot in the storage device 170.

At 512, the hypervisor 110 and the device emulator 112 commence the I/O emulation for the non-real time thread 122. The device emulator may be internal to the guest machine 120 or external to the guest machine 120. In some implementations, the device emulator 112 may be located in the hypervisor 110. In other implementations, the device emulator 112 may be located in user space 180 within the host machine 130.

At 514, the guest machine 120 receives a real time thread 124 for execution. The real time thread 124 may be received by the guest machine 120 at any time subsequent to the guest machine 120 initiating execution of the non-real time thread 122 and prior to the guest machine 120 completing execution of the non-real time thread 122.

At 516, the hypervisor 110 determines whether a non-real time I/O emulation is in progress. In at least some implementations, the hypervisor 110 may assess the status of the device emulator 112 to determine whether a non-real time I/O emulation is in progress. If the hypervisor 110 determines a non-real time I/O emulation is not in progress, the method 500 proceeds to 532. If the hypervisor 110 determines a non-real time I/O emulation is in progress in the device emulator 112, the method 500 proceeds to 518.

At 518, the hypervisor 110 determines whether the non-real time I/O emulation can be aborted. If the non-real time I/O emulation can be aborted, the method 500 proceeds to about the non-real time I/O emulation at 526. If the non-real time I/O emulation involves an input or output activity that cannot be aborted (i.e., the non-real time I/O emulation is non-abortable), the method 500 proceeds to 520.

At 520, responsive to determining the non-real time I/O emulation is non-abortable, the hypervisor 110 marks, flags, or otherwise identifies the non-real time I/O emulation as non-abortable.

At 522, the hypervisor 110 transfers the non-real time I/O emulation to an asynchronous work thread.

At 524, the hypervisor 110 determines whether the transfer of the non-real time I/O emulation to the asynchronous work thread has completed. If the transfer to the asynchronous work thread has not completed the method 500 returns to 522. If the transfer to the asynchronous work thread has completed, the hypervisor 110 causes the asynchronous work thread to complete the non-real time I/O emulation at 534 and aborts the non-real time I/O emulation at 526.

At 526, responsive to determining the transfer of the non-real time I/O emulation to the asynchronous work thread has completed at 520, the hypervisor 110 aborts the non-real time I/O emulation caused by the non-real time thread 122 executed by the guest machine 120 at 504.

At 528, the hypervisor 110 causes the guest machine 120 to switch to a real time context prior to executing the real time thread 124 received at 514. Note the asynchronous work thread causes the device emulator 112 to proceed with the non-real time I/O emulation, thus the non-real time I/O emulation proceeds simultaneously with the execution of the real time thread 124 by the guest machine 120

At 530, the hypervisor 110 causes the guest machine 120 to execute the real time thread 124 received at 514.

At 532, if the guest machine 120 has completed the execution of real time thread 124, the method 500 concludes at 534. If the guest machine 120 has not completed execution of the real time thread 124, the method 500 returns to 530. Upon the guest machine 120 concluding the execution of the real time thread, the method 500 concludes at 534.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to claim 1, there is provided a method of executing a real time task on a guest machine. The method may include determining, by a hypervisor communicably coupled to the guest machine, whether the guest machine is executing a non-real time thread that causes a device emulator communicably coupled to the hypervisor to perform a non-real time I/O emulation, the determination by the hypervisor responsive to a receipt of a request to execute a real time thread by a guest machine; causing, by the hypervisor, the guest machine to abort the non-real time I/O emulation responsive to determining the guest machine is causing the device emulator to perform the non-real time I/O emulation; switching, by the hypervisor, the guest machine from a non-real time context to a real time context; causing, by the hypervisor, the guest machine to execute the real time thread; causing, by the hypervisor, the guest machine to revert from the real time context to the non-real time context responsive to completing the execution of the real time thread; and causing, by the hypervisor, the guest machine to execute the non-real time thread responsive to reverting the guest machine from the real time context to the non-real time context.

Example 2 may include elements of example 1, and the method may additionally include determining, by the hypervisor, whether the non-real time I/O emulation is abortable prior to causing the guest machine to abort the non-real time I/O emulation; and transferring, by the hypervisor, at least a portion of the non-real time I/O emulation to a work thread prior to switching the guest machine from the non-real time context to the real time context responsive to a determination that the non-real time I/O thread is non-abortable.

Example 3 may include elements of example 2 and the method may additionally include causing, by the hypervisor, the device emulator to complete the non-real time I/O emulation using the work thread while simultaneously causing the guest machine to execute the real time thread.

Example 4 may include elements of example 2 where transferring the non-real time I/O emulation to a work thread prior to switching the guest machine from the non-real time context to the real time context may include transferring, by the hypervisor, the non-real time I/O emulation to an asynchronous work thread prior to switching the guest machine from the non-real time context to the real time context.

Example 5 may include elements of example 1 and the method may additionally include acquiring, by the hypervisor, a system snapshot that includes a logical state of at least a portion of the guest machine prior to the hypervisor causing the guest machine to switch from the non-real time context to the real time context.

Example 6 may include elements of example 5 where causing the guest machine to revert to a non-real time context may include causing, by the hypervisor, the guest machine to revert from the real time context to a non-real time context using the acquired system snapshot.

According to example 7, there is provided a system for executing a real time thread on a guest machine in a virtualized environment. The system may include guest machine circuitry; device emulator circuitry; and hypervisor circuitry communicably coupled to the guest machine circuitry and to the device emulator circuitry. The hypervisor circuitry may: determine whether the guest machine circuitry is causing the device emulator circuitry to perform a non-real time I/O emulation responsive to a receipt of an instruction by the guest machine circuitry to execute a real time thread; cause the device emulator circuitry to abort the non-real time I/O emulation responsive to a determination that the guest machine circuitry is causing the device emulator circuitry to perform the non-real time I/O emulation; cause the guest machine circuitry to switch from a non-real time context to a real time context responsive the device emulator circuitry aborting the non-real time I/O emulation; cause the guest machine circuitry to execute the real time thread responsive to causing the guest machine circuitry to switch from the non-real time context to the real time context; cause the guest machine circuitry to revert from the real time context to the non-real time context responsive to completing the execution of the real time thread; and cause the guest machine circuitry to execute the non-real time thread responsive to the guest machine circuitry reverting from the real time context to the non-real time context.

Example 8 may include elements of example 7 and the hypervisor circuitry may further determine whether the non-real time I/O emulation is abortable prior to causing the guest machine circuitry to abort the non-real time I/O emulation; and transfer at least a portion of the non-real time I/O emulation to a work thread prior to switching the guest machine circuitry from the non-real time context to the real time context responsive to a determination that the non-real time I/O thread is non-abortable.

Example 9 may include elements of example 8 and the hypervisor circuitry may further cause the device emulator circuitry to complete the non-real time I/O emulation using the work thread while simultaneously causing the guest machine circuitry to execute the real time thread.

Example 10 may include elements of example 8 and the hypervisor circuitry may further transfer the non-real time I/O emulation to an asynchronous work thread prior to causing the guest machine circuitry to switch from the non-real time context to the real time context.

Example 11 may include elements of example 7 and the hypervisor circuitry may further acquire a system snapshot that includes a logical state of at least a portion of the guest machine circuitry prior to the hypervisor circuitry causing the guest machine circuitry to switch from the non-real time context to the real time context.

Example 12 may include elements of example 11 where the hypervisor circuitry may further cause the guest machine circuitry to revert from the real time context to the non-real time context using the acquired system snapshot.

According to example 13, there is provided a nontransitory computer readable medium containing instructions that, when executed by a circuit, transform the circuit to dedicated and particular hypervisor. The hypervisor may: determine whether a communicably coupled guest machine is causing a communicably coupled device emulator to perform a non-real time I/O emulation responsive to a receipt of an instruction by the guest machine to execute a real time thread; cause the device emulator to abort the non-real time I/O emulation responsive to a determination that the guest machine is causing the device emulator to perform the non-real time I/O emulation; cause the guest machine to switch from a non-real time context to a real time context responsive the device emulator aborting the non-real time I/O emulation; cause the guest machine to execute the real time thread responsive to causing the guest machine to switch from the non-real time context to the real time context; cause the guest machine to revert from the real time context to the non-real time context responsive to completing the execution of the real time thread; and cause the guest machine to execute the non-real time thread responsive to the guest machine reverting from the real time context to the non-real time context.

Example 14 may include elements of example 13 where the instructions may further cause the hypervisor to: determine whether the non-real time I/O emulation is abortable prior to causing the guest machine to abort the non-real time I/O emulation; and transfer at least a portion of the non-real time I/O emulation to a work thread prior to switching the guest machine from the non-real time context to the real time context responsive to a determination that the non-real time I/O thread is non-abortable.

Example 15 may include elements of example 14 where the instructions may further cause the hypervisor to: cause the device emulator to complete the non-real time I/O emulation using the work thread while simultaneously causing the guest machine to execute the real time thread.

Example 16 may include elements of example 14 where the instructions that cause the hypervisor to transfer the non-real time I/O emulation to a work thread prior to switching the guest machine to the real time context may further cause the hypervisor to: transfer the non-real time I/O emulation to an asynchronous work thread prior to causing the guest machine to switch to the real time context.

Example 17 may include elements of example 13 where the instructions may further cause the hypervisor to: acquire a system snapshot prior to causing the guest machine circuitry to switch to the real time context, the system snapshot including a logical state of at least a portion of the guest machine.

Example 18 may include elements of example 17 where the instructions that cause the hypervisor to cause the guest machine to revert to a non-real time context may further cause the hypervisor to: cause the guest machine to revert to a non-real time context using the acquired system snapshot.

According to example 19, there is provided a device including hypervisor circuitry. The hypervisor circuitry may: determine whether guest machine circuitry causes device emulator circuitry to perform a non-real time I/O emulation, the determination made responsive to a receipt of an indication to execute a real time thread by the guest machine circuitry; cause the device emulator circuitry to abort the non-real time I/O emulation responsive to a determination that the guest machine circuitry causes the device emulator circuitry to perform the non-real time I/O emulation; cause the guest machine circuitry to switch from a non-real time context to a real time context responsive the device emulator circuitry aborting the non-real time I/O emulation; cause the guest machine circuitry to execute the real time thread responsive to causing the guest machine circuitry to switch from the non-real time context to the real time context; cause the guest machine circuitry to revert from the real time context to a non-real time context responsive to completing the execution of the real time thread; and cause the guest machine circuitry to execute the non-real time thread responsive to the guest machine circuitry reverting to the non-real time context.

Example 20 may include elements of example 19 where the hypervisor circuitry may be further configured to: determine whether the non-real time I/O emulation is abortable prior to causing the guest machine circuitry to abort the non-real time I/O emulation; and transfer at least a portion of the non-real time I/O emulation to a work thread prior to switching the guest machine circuitry from the non-real time context to the real time context responsive to a determination that the non-real time I/O thread is non-abortable.

Example 21 may include elements of example 20 where the hypervisor circuitry may be further configured to: cause the device emulator circuitry to complete the non-real time I/O emulation using the work thread while simultaneously causing the guest machine circuitry to execute the real time thread.

Example 22 may include elements of example 20 where the hypervisor circuitry may be further configured to: transfer the non-real time I/O emulation to an asynchronous work thread prior to causing the guest machine circuitry to switch from the non-real time context to the real time context.

Example 23 may include elements of example 19 where the hypervisor circuitry may be further configured to: acquire a system snapshot that includes a logical state of at least a portion of the guest machine circuitry prior to the hypervisor circuitry causing the guest machine circuitry to switch from the non-real time context to the real time context.

Example 24 may include elements of example 23 where the hypervisor circuitry may be further configured to: cause the guest machine circuitry to revert from the real time context to the non-real time context using the acquired system snapshot.

According to example 25, there is provided a system for executing a real time task on a guest machine. The system may include: a means for determining whether the guest machine is executing a non-real time thread that causes a device emulator to perform a non-real time I/O emulation responsive to a receipt of a request to execute a real time thread by the guest machine; a means for causing the guest machine to abort the non-real time I/O emulation responsive to determining the guest machine is causing the device emulator to perform the non-real time I/O emulation; a means for switching the guest machine from a non-real time context to a real time context; a means for causing the guest machine to execute the real time thread; a means for causing the guest machine to revert from the real time context to the non-real time context responsive to completing the execution of the real time thread; and a means for causing the guest machine to execute the non-real time thread.

Example 26 may include elements of example 25, and the system may further include: a means for determining whether the non-real time I/O emulation is abortable prior to causing the guest machine to abort the non-real time I/O emulation; and a means for transferring at least a portion of the non-real time I/O emulation to a work thread prior to switching the guest machine from the non-real time context to the real time context responsive to a determination that the non-real time I/O thread is non-abortable.

Example 27 may include elements of example 26, and the system may further include a means for causing a communicably coupled device emulator to complete the non-real time I/O emulation using the work thread while simultaneously causing the guest machine to execute the real time thread.

Example 28 may include elements of example 26 where the means for transferring the non-real time I/O emulation to a work thread prior to switching the guest machine from the non-real time context to the real time context may further include a means for transferring the non-real time I/O emulation to an asynchronous work thread prior to switching the guest machine from the non-real time context to the real time context.

Example 29 may include elements of example 25 and the system may further include a means for acquiring a system snapshot that includes a logical state of at least a portion of the guest machine prior to the hypervisor causing the guest machine to switch from the non-real time context to the real time context.

Example 30 may include elements of example 29 where the means for causing the guest machine to revert from the real time context to the non-real time context may include a means for causing the guest machine to revert from the real time context to the non-real time context using the acquired system snapshot.

According to example 31, there is provided a system for executing real time threads on a guest machine, the system being arranged to perform the method of any of examples 1 through 6.

According to example 32, there is provided a chipset arranged to perform the method of any of examples 1 through 6.

According to example 33, there is provided a non-transitory machine readable medium comprising a plurality of instructions that, in response to be being executed on a computing device, cause the computing device to carry out the method according to any of examples 1 through 6.

According to example 34, there is provided a device configured for executing real time threads on a guest machine, the device being arranged to perform the method of any of the examples 1 through 6.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system to execute a real time thread on a guest machine in a virtualized environment, comprising:
   guest machine circuitry;
   device emulator circuitry; and
   hypervisor circuitry communicably coupled to the guest machine circuitry and to the device emulator circuitry, the hypervisor circuitry to:
      responsive to receipt of an instruction at the guest machine circuitry to execute a real time thread, determine that the guest machine circuitry is causing the device emulator circuitry to perform a non-real time I/O emulation of an I/O device;
      responsive to a determination that the non-real time I/O emulation is non-abortable, transfer at least a portion of the non-real time I/O emulation to a work thread prior to switching the guest machine circuitry to a real time context;
      cause the guest machine circuitry to switch from a non-real time context to the real time context;
      cause the guest machine circuitry to execute the real time thread responsive to causing the guest machine circuitry to switch from the non-real time context to the real time context;
      cause the guest machine circuitry to revert from the real time context to the non-real time context responsive to completing the execution of the real time thread; and
      cause the guest machine circuitry to execute a non-real time thread responsive to the guest machine circuitry reverting from the real time context to the non-real time context, the non-real time thread separate from the work thread.

2. The system of claim 1, the hypervisor circuitry to:
   cause the device emulator circuitry to complete the non-real time I/O emulation using the work thread while simultaneously causing the guest machine circuitry to execute the real time thread.

3. The system of claim 1, wherein the work thread is an asynchronous work thread.

4. The system of claim 1, the hypervisor circuitry to:
   acquire a system snapshot that includes a logical state of at least a portion of the guest machine circuitry prior to the hypervisor circuitry causing the guest machine circuitry to switch from the non-real time context to the real time context.

5. The system of claim 4, the hypervisor circuitry to:
   cause the guest machine circuitry to revert from the real time context to the non-real time context using the system snapshot.

6. The system of claim 1, wherein the hypervisor circuitry is to:
   responsive to a determination that the non-real time I/O emulation is abortable, cause the device emulator circuitry to abort the non-real time I/O emulation.

7. A method of executing a real time task on a guest machine, comprising:
   accessing a first instruction to execute a first real time thread;
   responsive to the first instruction to execute the first real time thread, determining, by a hypervisor communicably coupled to the guest machine, that the guest machine is executing a first non-real time thread that causes a device emulator communicably coupled to the hypervisor to perform a first non-real time I/O emulation of an I/O device;

determining that the first non-real time I/O emulation is non-abortable;

responsive to the first non-real time I/O emulation being non-abortable, transferring, by the hypervisor, at least a portion of the first non-real time I/O emulation to a work thread prior to switching the guest machine to a first real time context;

switching, by the hypervisor, the guest machine from a first non-real time context to the first real time context;

causing, by the hypervisor, the guest machine to execute the first real time thread;

causing, by the hypervisor, the guest machine to revert from the first real time context to the first non-real time context responsive to completing the execution of the first real time thread; and causing, by the hypervisor, the guest machine to execute the first non-real time thread responsive to causing the guest machine to revert from the first real time context to the first non-real time context, the first non-real time thread separate from the work thread.

8. The method of claim 7, further including
causing, by the hypervisor, the device emulator to complete the first non-real time I/O emulation using the work thread while simultaneously causing the guest machine to execute the first real time thread.

9. The method of claim 7, wherein the transferring of the at least the portion of the first non-real time I/O emulation to the work thread prior to the switching of the guest machine from the first non-real time context to the first real time context includes:

transferring, by the hypervisor, the first non-real time I/O emulation to an asynchronous work thread prior to the switching of the guest machine from the first non-real time context to the first real time context.

10. The method of claim 7, further including:

acquiring, by the hypervisor, a system snapshot that includes a logical state of at least a portion of the guest machine prior to the hypervisor causing the guest machine to switch from the first non-real time context to the first real time context.

11. The method of claim 10, wherein the causing of the guest machine to revert from the first real time context to the first non-real time context includes:

causing, by the hypervisor, the guest machine to revert from the first real time context to the first non-real time context using the system snapshot.

12. The method of claim 7, further including:

responsive to receipt of a second instruction by the guest machine to execute a second real time thread, determining, by the hypervisor, that the guest machine is executing a second non-real time thread that causes the device emulator to perform a second non-real time I/O emulation of the I/O device;

responsive to a determination that the second non-real time I/O emulation is abortable, cause the device emulator to abort the second non-real time I/O emulation;

switching, by the hypervisor, the guest machine from a second non-real time context to a second real time context;

causing, by the hypervisor, the guest machine to execute the second real time thread;

causing, by the hypervisor, the guest machine to revert from the second real time context to the second non-real time context responsive to completing the execution of the second real time thread; and causing, by the hypervisor, the guest machine to execute the second non-real time thread responsive to causing the guest machine to revert from the second real time context to the second non-real time context.

13. One or more non-transitory computer readable storage media comprising first instructions that, when executed by a circuit, transform the circuit to a dedicated and particular hypervisor, the hypervisor to:

responsive to receipt of a second instruction at a guest machine to execute a real time thread, determine that a communicably coupled guest machine is causing a communicably coupled device emulator to perform a non-real time I/O emulation of an I/O device;

responsive to a determination that the non-real time I/O emulation is non-abortable, transfer at least a portion of the non-real time I/O emulation to a work thread prior to switching the guest machine to a real time context;

cause the guest machine to switch from a non-real time context to the real time context;

cause the guest machine to execute the real time thread responsive to causing the guest machine to switch from the non-real time context to the real time context;

cause the guest machine to revert from the real time context to the non-real time context responsive to completing the execution of the real time thread; and cause the guest machine to execute a non-real time thread responsive to the guest machine reverting from the real time context to the non-real time context, the non-real time thread separate from the work thread.

14. The non-transitory computer readable storage media of claim 13, wherein the first instructions are to cause the hypervisor to:

cause the device emulator to complete the non-real time I/O emulation using the work thread while simultaneously causing the guest machine to execute the real time thread.

15. The non-transitory computer readable storage media of claim 13, wherein the first instructions that cause the hypervisor to transfer the non-real time I/O emulation to the work thread prior to switching the guest machine from the non-real time context to the real time context cause the hypervisor to:

transfer the non-real time I/O emulation to an asynchronous work thread prior to causing the guest machine to switch from the non-real time context to the real time context.

16. The non-transitory computer readable storage media of claim 13, wherein the first instructions are to cause the hypervisor to:

acquire a system snapshot prior to causing the guest machine to switch from the non-real time context to the real time context, the system snapshot including a logical state of at least a portion of the guest machine.

17. The non-transitory computer readable storage media of claim 16, wherein the first instructions that cause the hypervisor to cause the guest machine to revert from the real time context to the non-real time context cause the hypervisor to:

cause the guest machine to revert from the real time context to the non-real time context using the system snapshot.

18. The non-transitory computer readable storage media of claim 13, wherein the first instructions are to cause the hypervisor to:

responsive to a determination that the non-real time I/O emulation is abortable, cause the device emulator to abort the non-real time I/O emulation.

19. A device comprising:
interface circuitry, and:
hypervisor circuitry, the hypervisor circuitry structured to:
responsive to receipt of an instruction at guest machine circuitry to execute a real time thread, determine that the guest machine circuitry causes device emulator circuitry to perform a non-real time I/O emulation of an I/O device;
  responsive to a determination that the non-real time I/O emulation is non-abortable, transfer at least a portion of the non-real time I/O emulation to a work thread prior to switching the guest machine circuitry to a real time context;
  cause the guest machine circuitry to switch from a non-real time context to the real time context responsive to the device emulator circuitry aborting the non-real time I/O emulation;
  cause the guest machine circuitry to execute the real time thread responsive to causing the guest machine circuitry to switch from the non-real time context to the real time context;
  cause the guest machine circuitry to revert from the real time context to the non-real time context responsive to completing the execution of the real time thread; and
  cause the guest machine circuitry to execute a non-real time thread responsive to the guest machine circuitry reverting from the real time context to the non-real time context, the non-real time thread separate from the work thread.

20. The device of claim 19, wherein the hypervisor circuitry is structured to:
  cause the device emulator circuitry to complete the non-real time I/O emulation using the work thread while simultaneously causing the guest machine circuitry to execute the real time thread.

21. The device of claim 19, wherein work thread is an asynchronous work thread.

22. The device of claim 19, wherein the hypervisor circuitry is structured to:
  acquire a system snapshot that includes a logical state of at least a portion of the guest machine circuitry prior to the hypervisor circuitry causing the guest machine circuitry to switch from the non-real time context to the real time context.

23. The device of claim 22, wherein the hypervisor circuitry is structured to:
  cause the guest machine circuitry to revert from the real time context to the non-real time context using the system snapshot.

24. The device of claim 19, wherein the hypervisor circuitry is structured to:
  responsive to a determination that the non-real time I/O emulation is abortable, cause the device emulator circuitry to abort the non-real time I/O emulation.

* * * * *